United States Patent
Lee

(10) Patent No.: US 10,326,186 B2
(45) Date of Patent: Jun. 18, 2019

(54) APPARATUS FOR COOLING BATTERY

(71) Applicant: HYUNDAI MOTOR COMPANY, Seoul (KR)

(72) Inventor: Gun Goo Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 212 days.

(21) Appl. No.: 15/371,684

(22) Filed: Dec. 7, 2016

(65) Prior Publication Data

US 2018/0115031 A1 Apr. 26, 2018

(30) Foreign Application Priority Data

Oct. 24, 2016 (KR) .................. 10-2016-0138409

(51) Int. Cl.
*F28F 9/02* (2006.01)
*H01M 10/613* (2014.01)
(Continued)

(52) U.S. Cl.
CPC ..... *H01M 10/6568* (2015.04); *B60L 11/1874* (2013.01); *B60L 11/1879* (2013.01);
(Continued)

(58) Field of Classification Search
CPC ........... H01M 10/6568; H01M 10/613; H01M 10/625; F28F 9/0268; F28F 9/22;
(Continued)

(56) References Cited

U.S. PATENT DOCUMENTS

2005/0153199 A1* 7/2005 Yagi .................. H01M 2/105
429/148
2006/0093901 A1* 5/2006 Lee ................... H01M 2/1072
429/120
2012/0157719 A1* 6/2012 Teles .................. B01J 19/006
568/365
(Continued)

FOREIGN PATENT DOCUMENTS

CA 2774167 A1 * 3/2011 ............... F28D 7/16
DE 919657 C * 11/1954 ............. F15D 1/001
(Continued)

OTHER PUBLICATIONS

KR 10-2006-0059453 English Machine Translation—Retrieved Aug. 2018.*
(Continued)

*Primary Examiner* — Cassey D Bauer
*Assistant Examiner* — Jenna M Hopkins
(74) *Attorney, Agent, or Firm* — Knobbe Martens Olson & Bear LLP

(57) ABSTRACT

An apparatus for cooling a battery includes a cooling channel disposed to exchange heat with a battery module by cooling water and provided with an inlet into and an outlet through which the cooling water is introduced and discharged; branch channels formed in the cooling channel to be branched in parallel with a longitudinal direction of the cooling channel to make the cooling water introduced through the inlet flow toward the outlet while the cooling water passes through the branch channels; and a plurality of flow guides disposed between the inlet and the branch channels at a predetermined interval along a direction in which the branch channels are branched and guiding the flow of cooling water introduced through the inlet to allow the cooling water to be uniformly introduced into the respective branch channels.

8 Claims, 5 Drawing Sheets

(51) Int. Cl.
*H01M 10/625* (2014.01)
*H01M 10/6556* (2014.01)
*H01M 10/6568* (2014.01)
*F28F 9/22* (2006.01)
*B60L 11/18* (2006.01)
*F28F 27/02* (2006.01)

(52) U.S. Cl.
CPC .......... *F28F 9/0268* (2013.01); *F28F 9/0278* (2013.01); *F28F 9/22* (2013.01); *H01M 10/613* (2015.04); *H01M 10/625* (2015.04); *H01M 10/6556* (2015.04); *B60L 2240/36* (2013.01); *F28F 27/02* (2013.01); *F28F 2009/222* (2013.01); *F28F 2009/224* (2013.01); *F28F 2009/228* (2013.01); *H01M 2220/20* (2013.01); *Y02T 10/705* (2013.01); *Y02T 10/7005* (2013.01)

(58) Field of Classification Search
CPC .......... F28F 2009/222; F28F 2009/224; F28F 2009/228; F28F 27/02; B60L 11/1874; B60L 11/187
See application file for complete search history.

(56) References Cited

U.S. PATENT DOCUMENTS

| | | | |
|---|---|---|---|
| 2013/0199288 A1* | 8/2013 | Goenka | F15D 1/001 73/202 |
| 2013/0244078 A1* | 9/2013 | Kwak | H01M 10/625 429/120 |
| 2014/0272496 A1* | 9/2014 | Han | H01M 10/625 429/83 |
| 2015/0030890 A1* | 1/2015 | Inoue | H01M 2/1077 429/7 |
| 2016/0197367 A1* | 7/2016 | Chikugo | H01M 8/04223 429/446 |
| 2017/0198988 A1* | 7/2017 | Herring | F28F 9/0268 |
| 2017/0231115 A1* | 8/2017 | Kobayashi | F28F 1/025 |

FOREIGN PATENT DOCUMENTS

| | | | | | |
|---|---|---|---|---|---|
| DE | 4441162 | A1 | * | 6/1996 | ......... B60H 1/00278 |
| DE | 19644710 | A1 | * | 4/1998 | ............. D06F 58/20 |
| EP | 1610407 | A1 | * | 12/2005 | .......... B60L 11/1874 |
| JP | 2006012847 | A | * | 1/2006 | .......... B60L 11/1874 |
| JP | 2006128123 | A | * | 5/2006 | ........... H01M 2/1072 |
| JP | 2006128124 | A | * | 5/2006 | ........... H01M 2/1077 |
| JP | 2006269426 | A | * | 10/2006 | ........... H01M 10/625 |
| JP | 2006278327 | A | * | 10/2006 | ........... H01M 2/1077 |
| JP | 5343007 | B2 | * | 11/2013 | ........... H01L 23/473 |
| JP | 2015-26569 | A | | 2/2015 | |
| JP | 2015026569 | A | * | 2/2015 | ......... H01M 2/1077 |
| JP | 2015-156347 | A | | 8/2015 | |
| JP | WO 2017022244 | A1 | * | 2/2017 | ........... H01L 23/473 |
| JP | 2017143171 | A | * | 8/2017 | .............. F28F 1/025 |
| KR | 20060037600 | A | * | 5/2006 | |
| KR | 20060037601 | A | * | 5/2006 | |
| KR | 20060037627 | A | * | 5/2006 | |
| KR | 10-2006-0059453 | | | 6/2006 | |
| KR | 20060059452 | A | * | 6/2006 | |
| KR | 20060059453 | A | * | 6/2006 | |
| KR | 20070105116 | A | * | 10/2007 | |
| KR | 10-2012-0091260 | A | | 8/2012 | |
| KR | 10-2014-0124064 | A | | 10/2014 | |
| KR | 10-2016-0113902 | A | | 10/2016 | |
| WO | WO-2016117342 | A1 | * | 7/2016 | ................ F28F 9/22 |

OTHER PUBLICATIONS

Specific Heat and Heat Capacity—Indiana University Northwest (Apr. 2001).*
Specific Heat Capacity of Water Water Properties, USGS Water Science School—(Mar. 2014).*
Notice of Allowance dated Nov. 16, 2017 in corresponding Korean Patent Application No. 10-2016-0138409—2 pages.
Office Action dated Jul. 13, 2017 of corresponding Korean Patent Application No. 10-2016-0138409—7 pages.

* cited by examiner

APPARATUS FOR COOLING BATTERY

CROSS REFERENCE TO RELATED APPLICATION

The present application claims priority of Korean Patent Application No. 10-2016-0138409 filed on Oct. 24, 2016, the entire contents of which is incorporated herein for all purposes by this reference.

BACKGROUND

Field

The present disclosure relates to an apparatus for cooling a battery capable of improving cooling efficiency.

Description of the Related Art

A hybrid vehicle, an electric vehicle, and a fuel cell vehicle have used a high voltage battery to supply electric energy for driving of these vehicles.

The high voltage battery is configured of a battery pack in which a plurality of unit cells or modules may be connected to each other to generate a high voltage and generates high power using the same.

That is, energy stored in the high voltage battery is transferred to a motor through an inverter to be used for starting of a vehicle, acceleration, high efficiency driving, or the like and if surplus energy is generated from an engine, the motor is used as a generator to store the surplus energy in the high voltage battery.

However, the high voltage battery consumes a considerable amount of current amount and thus generates a lot of heat from an inside thereof. Therefore, the vehicles using the high voltage battery requires a cooling system for cooling the high voltage battery.

The disclosure of this section is to provide background of the invention. Applicant notes that this section may contain information available before this application. However, by providing this section, Applicant does not admit that any information contained in this section constitutes prior art.

SUMMARY

One aspect of the present invention provides an apparatus for cooling a battery capable of improving cooling efficiency by making a flow distribution of cooling water flowing in a cooling channel uniform.

According to one aspect of the present invention, there is provided an apparatus for cooling a battery, including: a cooling channel disposed to exchange heat with a battery module by cooling water and provided with an inlet into and an outlet through which the cooling water is introduced and discharged; branch channels formed in the cooling channel to be branched in parallel with a longitudinal direction of the cooling channel to make the cooling water introduced through the inlet flow toward the outlet while the cooling water passes through the branch channels; and a plurality of flow guides disposed between the inlet and the branch channels at a predetermined interval along a direction in which the branch channels are branched and guiding the flow of cooling water introduced through the inlet to allow the cooling water to be uniformly introduced into the respective branch channels.

The flow guide may be disposed between an exit of the inlet formed in the cooling channel and an entrance of the branch channel.

A partition wall may be formed between the branch channels along a straight longitudinal direction of the cooling channel and the flow guide may be disposed on an extension line continued in the longitudinal direction of the cooling channel from the partition wall.

The flow guides may be individually disposed to correspond to the respective partition walls and passages may be formed between the flow guides to correspond to the respective branch channels.

The passage may include: a central passage formed between the flow guides straight connected from the exit of the inlet to the inside of the cooling channel; and side passages formed between the remaining flow guides, in which a width direction length of the central passage may be formed to be shorter than that of the side passages.

A width direction length of the respective side passages may be formed to be the same.

The flow guides disposed at one side and the flow guides disposed at the other side with respect to the central passage may be each disposed on a virtual disposition line formed in a straight shape.

The flow guide may be formed in a board shape formed long in a longitudinal direction and the flow guide may be disposed so that the longitudinal direction of the flow guide coincides with a longitudinal direction of the disposition line.

The disposition line may be formed in a width direction orthogonal to the longitudinal direction of the cooling channel and thus the flow guide may be provided along the width direction orthogonal to the longitudinal direction of the cooling channel.

The flow guides may be disposed to be spaced apart from each other by a predetermined distance from the exit of the inlet toward the inside of the cooling channel.

The width direction length of the central passage may be 3 to 7 mm, the width direction length of the side passage may be 8 to 12 mm, the disposition line may be formed in the width direction orthogonal to the longitudinal direction of the cooling channel, and a shortest distance between the flow guide forming the central passage and the exit of the inlet may be 38 to 42 mm.

BRIEF DESCRIPTION OF THE DRAWINGS

The above and other features and advantages of the present invention will be more clearly understood from the following detailed description taken in conjunction with the accompanying drawings, in which.

DESCRIPTION OF EMBODIMENTS

Embodiments of the present invention will be described in detail with reference to the accompanying drawings.

An apparatus for cooling a battery according to an embodiment of the present invention may be configured to include a cooling channel or inner space 3, a plurality of branch channels 11, and a plurality of flow guides 13.

Figure 1:
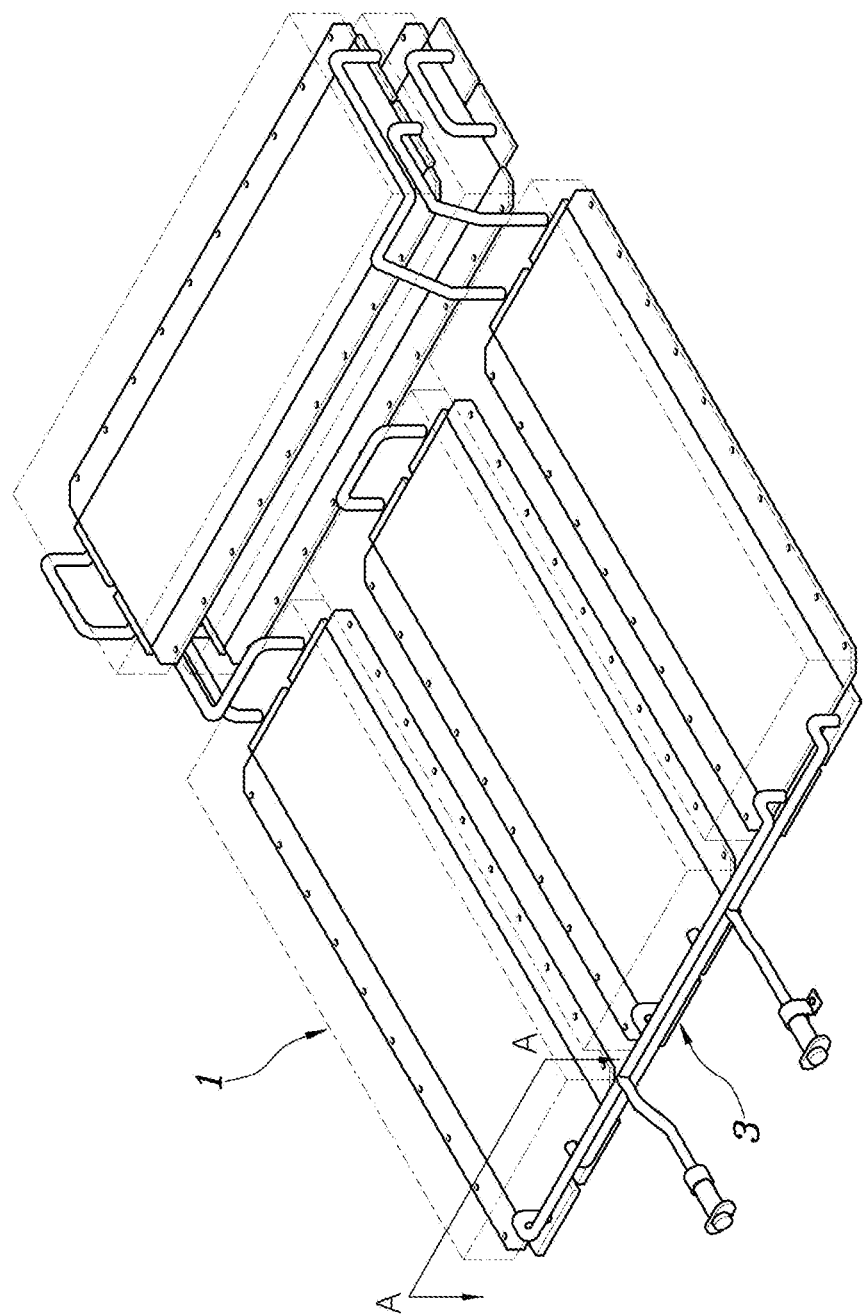
FIG. 1 is a diagram for describing a coupling relationship between a battery module and a cooling channel which may be applied to embodiments of the present invention.
Figure 2:
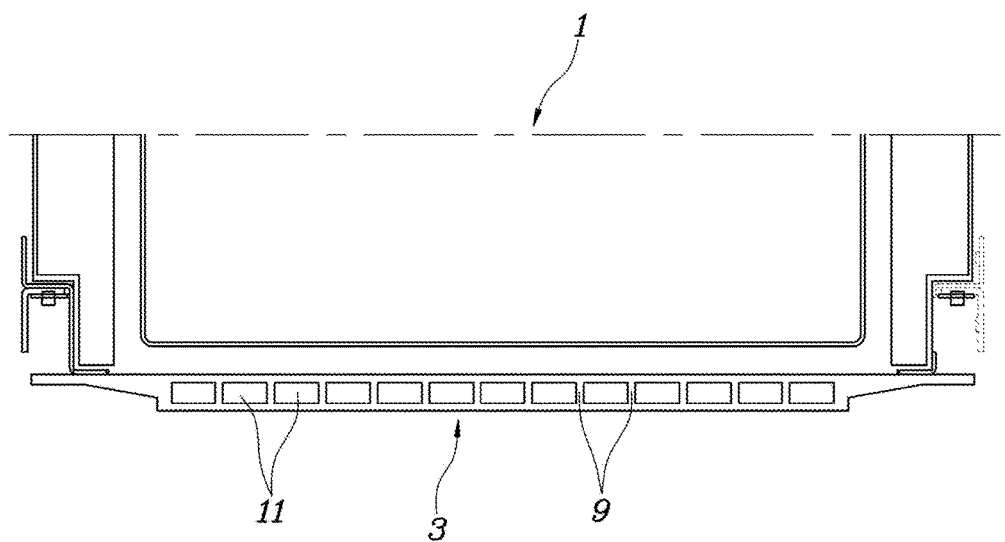
FIG. 2 is a cross-sectional view taken along the line A-A for describing the coupling relationship between the battery module and the cooling channel which may be applied to embodiments of the present invention.
Figure 3:
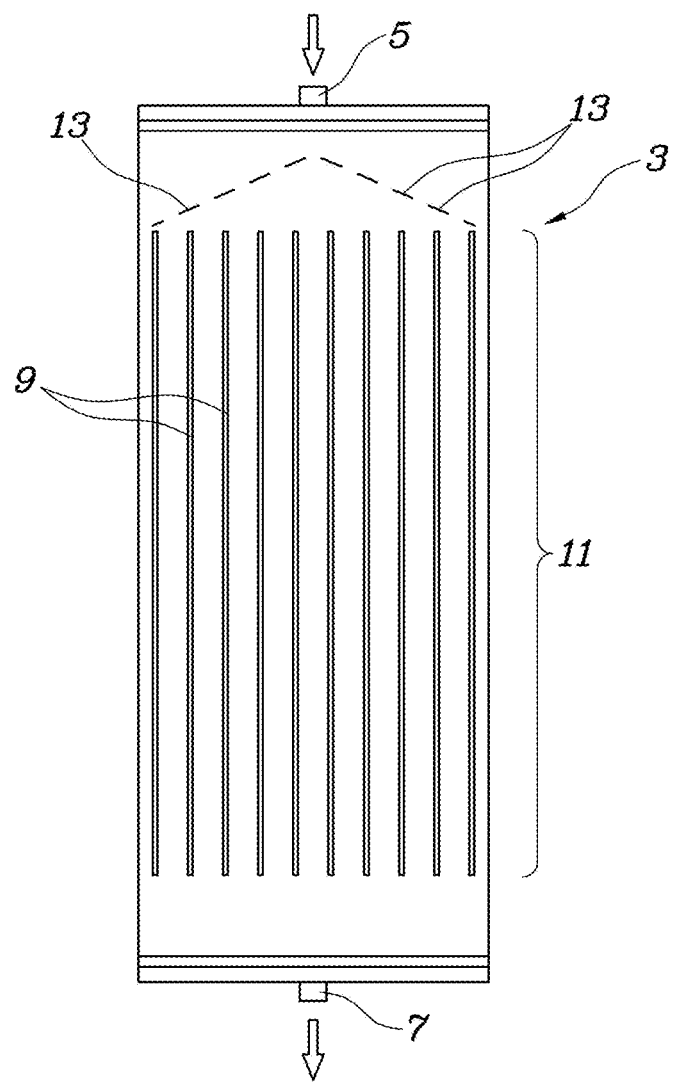
FIG. 3 is a diagram illustrating a structure of a flow guide disposed in a cooling channel according to a first embodiment of the present invention.

Describing embodiments of the present invention with reference to FIGS. 1 to 3, first, the cooling channel 3 may be disposed to exchange heat with a battery module 1 by cooling water and provided with an inlet 5 into and an outlet 7 through which the cooling water is introduced and discharged.

For example, the cooling channel 3 is disposed in a state in which it contacts a bottom surface of the battery module 1 installed in a vehicle to exchange cooling water with the battery module 1, such that the battery module 1 is cooled.

The cooling channel 3 is formed long in a longitudinal direction while having approximately a rectangular parallelepiped shape and a middle of one end thereof may be provided with the inlet 5 into which the cooling water is introduced and a middle of the other end thereof may be provided with the outlet 7 through which the cooling water is discharged.

The branch channels 11 may be formed to be branched in parallel with the longitudinal direction of the cooling channel or inner space 3 and thus may be formed to flow toward the outlet 7 while passing through the cooling water introduced through the inlet 5.

For example, the channels formed in parallel with the longitudinal direction of the cooling channel 3 are formed to be individually branched along a width direction of the cooling channel 3, such that the cooling water introduced into the cooling channel 3 may pass through the branch channels 11 and then may be discharged to the outside of the cooling channel 3 through the outlet 7.

In particular, the flow guides 13 according to the embodiment of the present invention may be disposed between the inlet 5 and the branch channels 11 at a predetermined interval along a direction in which the branch channels 11 are branched. By this configuration, the flow of cooling water introduced through the inlet 5 is guided to the branch channels 11 by the flow guides 13, such that the cooling water passing through the openings between the fluid guides 13 may be uniformly introduced into the respective branch channels 11.

That is, according to the cooling scheme using the cooling channel 3, if the cooling water flows in a direction vertical to a moving direction of the cooling water while being uniformly distributed, a heat conduction is uniformly induced on a surface on which the cooling channel 3 contacts a heat source, thereby improving heat dissipation performance of the cooling channel 3.

Therefore, according to the embodiment of the present invention, the flow of cooling water introduced into the cooling channel 3 through the inlet 5 flows while being guided by the flow guides 13, such that the cooling water is not concentrated on a middle portion crossing between the inlet 5 and the outlet 7 but flows while being diffused to both sides of the middle portion.

Therefore, the cooling water flowing in the cooling channel 3 uniformly flows in the respective branch channels 11 by the flow guides 13 to increase heat exchange efficiency between the battery module 1 and the cooling water to thereby improve the cooling efficiency as well as to reduce a pressure loss for the flow of cooling water in the cooling channel 3 to thereby reduce a pumping loss, thereby improving fuel efficiency.

Meanwhile, referring to FIG. 3, the flow guides 13 according to the embodiment of the present invention may be disposed between an exit of the inlet 5 formed in the cooling channel 3 and entrances of the branch channels 11.

Further, a partition wall 9 may be formed between the two immediately neighboring branch channels 11 along a straight longitudinal direction of the cooling channel 3 and the flow guide may be disposed on an extension line continued in the longitudinal direction of the cooling channel 3 from the partition wall 9.

In particular, the flow guides 13 may be individually disposed to correspond to the respective partition walls 9 and passages may be formed between the flow guides 13 to correspond to the respective branch channels 11.

That is, the plurality of partition walls 9 is disposed in parallel in the cooling channel 3 along the longitudinal direction thereof, such that the branch channels 11 may be formed in the cooling channel 3 by the partition walls. Further, the flow guides 13 are each disposed to correspond to each partition wall 9, and thus the cooling water is guided into the branch channels 11 rather than the partition walls 9 by the flow guides 13, such that the cooling water may uniformly flow in the respective branch channels 11.

Figure 4:
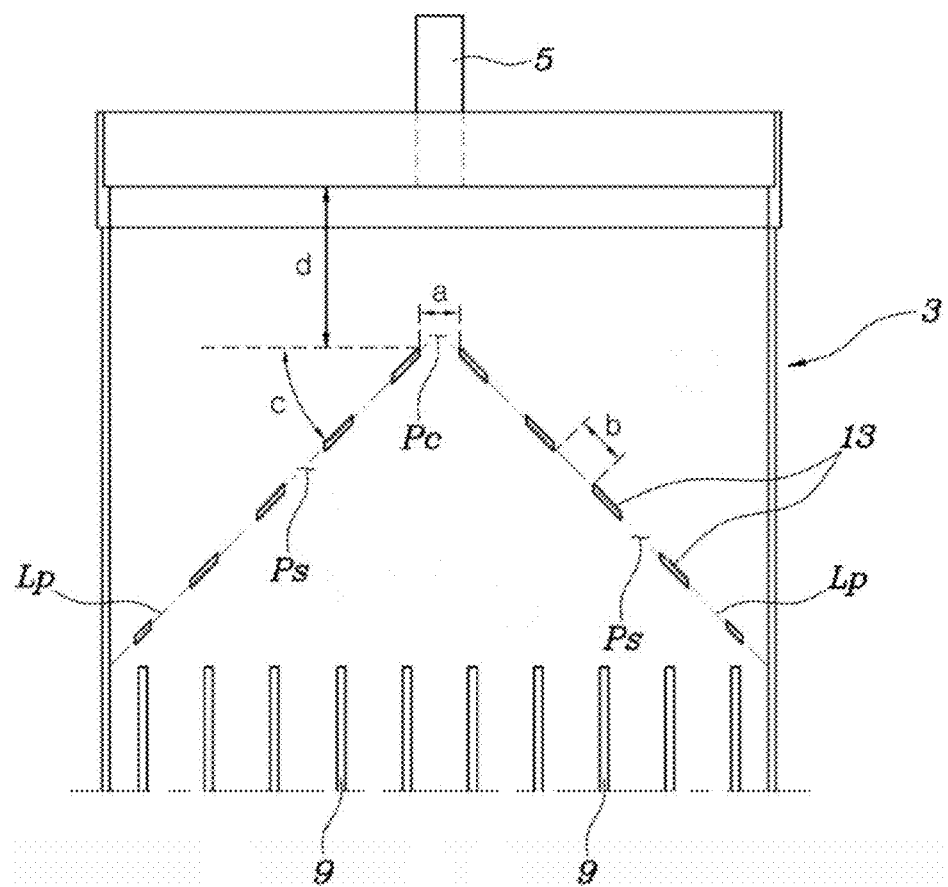
FIG. 4 is a diagram for describing design factors for a disposition of a flow guide according to an embodiment of the present invention.

Further, referring to FIGS. 3 and 4, according to the embodiment of the present invention, the passage may be configured to include one central passage Pc and a plurality of side passages Ps.

In detail, the central passage Pc may be formed between the flow guides 13, on a passage straight connected from the exit of the inlet 5 to the inside of the cooling channel 3.

Further, the side passage Ps may be formed between the remaining flow guides 13.

In this case, a width direction length of the central passage Pc may be formed to be shorter than that of the side passage Ps.

Further, the width direction length of the respective side passages Ps may be formed to be the same.

That is, the cooling flow introduced into the cooling channel 3 first flows toward the central passage Pc, and therefore an interval of the central passage Pc is formed to be narrower than that of the remaining side passages Ps, such that the cooling water may flow while being diffused toward the side passages Ps formed at the left and right of the central passage Pc, thereby making the cooling water flow in the respective branch channels 11 as much as possible.

Further, according to the embodiment of the present invention, the flow guides 13 disposed at one side and the flow guides 13 disposed at the other side with respect to the central passage Pc may each be disposed on a virtual disposition line Lp formed in a straight shape.

For example, the flow guide 13 may be formed in a board shape formed long in the longitudinal direction and may be disposed so that the longitudinal direction of the flow guide 13 coincides with that of the disposition line Lp.

For example, as illustrated in FIG. 4, the flow guides 13 disposed at one side of the central passage Pc are disposed on one disposition line Lp and the flow guides disposed at the other side of the central passage Pc are disposed on another disposition line Lp, such that all the flow guides 13 may be disposed in a 'V'-letter shape.

As another example, the disposition line Lp is formed in a width direction orthogonal to the longitudinal direction of the cooling channel 3 and thus the flow guides 13 may be disposed along the width direction orthogonal to the longitudinal direction of the cooling channel 3.

Figure 5:
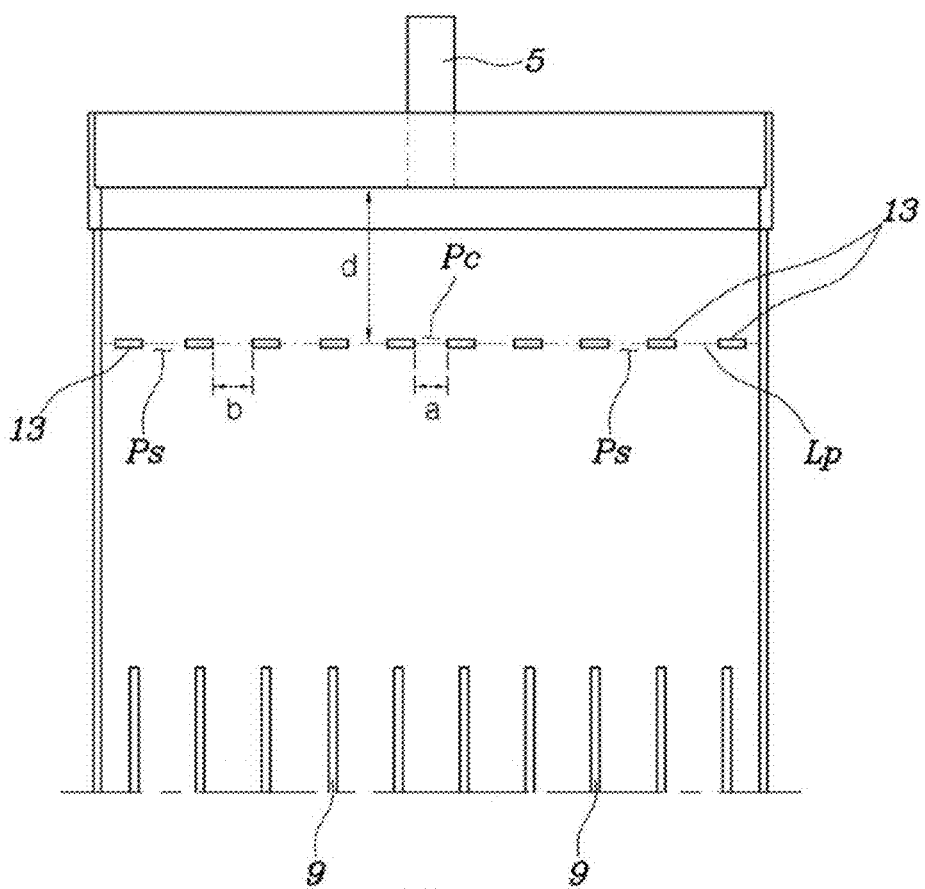
FIG. 5 is a diagram illustrating a structure of a flow guide disposed in a cooling channel according to a second embodiment of the present invention.

That is, as illustrated in FIG. 5, the disposition line Lp formed at one side of the central passage Pc is formed in a direction (width direction of the cooling channel 3) orthogonal to the branch channels 11 and the disposition line Lp formed at the other side of the central passage Pc is also formed in a direction orthogonal to the branch channels 11, such that all the flow guides 13 may be disposed in a '-'-letter shape.

Further, the flow guides 13 according to the embodiment of the present invention may be disposed to be spaced apart from each other by a predetermined distance from the exit of the inlet 5 toward the inside of the cooling channel 3.

That is, the flow guides 13 located at both sides of the central passage Pc and the exit of the inlet 5 are disposed to be spaced apart from each other by a predetermined distance.

Meanwhile, referring to FIGS. 4 and 5, according to the embodiment of the present invention, the flow guides 13 may be disposed in consideration of 4 design factors described above to make a flow velocity distribution of cooling water uniform in the cooling channel 3.

As the design factors, there may be the width direction length of the central passage Pc, the width direction length of the side passage Ps, an angle formed by the disposition line Lp and the width direction of the cooling channel 3, and a shortest distance between the flow guide 13 forming the central passage Pc and the exit of the inlet 5.

In embodiments, the width direction length of the central passage Pc may be 3 to 7 mm and the width direction length of the side passage Ps may be 8 to 12 mm.

Further, the disposition line Lp is formed in the width direction of the cooling channel 3 orthogonal to the longitudinal direction of the cooling channel 3, and thus the angle formed by the disposition line Lp and the width direction of the cooling channel 3 may be 0° and the shortest distance between the flow guide 13 forming the central passage Pc and the exit of the inlet 5 may be 38 to 42 mm.

That is, a plurality of design values are set for each design factor and the flow velocity distribution of cooling water may be calculated by the flow analysis on each case to calculate uniformity of the flow velocity. At this point, as the flow uniformity approaches 0, it may be determined that the flow velocity is uniform.

The following Table 1 illustrates an example of the flow uniformity for each case along with several cases in consideration of the plurality of design factors.

TABLE 1

| Case | Interval (a) of central passage | Internal (b) of side passage | Angle (c) of disposition line | Interval (d) of exit of inlet— flow guide | Flow velocity uniformity |
|---|---|---|---|---|---|
| 1 | 5 mm | 5 mm | 0° | 20 mm | 11.4982 |
| 2 | 10 mm | 5 mm | 0° | 40 mm | 25.1995 |
| 3 | 5 mm | 10 mm | 0° | 40 mm | 7.7354 |
| 4 | 10 mm | 10 mm | 0° | 20 mm | 24.2853 |
| 5 | 5 mm | 5 mm | 45° | 40 mm | 9.7802 |
| 6 | 10 mm | 5 mm | 45° | 20 mm | 29.2666 |
| 7 | 5 mm | 10 mm | 45° | 20 mm | 9.782 |
| 8 | 10 mm | 10 mm | 45° | 40 mm | 24.288 |

That is, the relationship formula for the flow velocity uniformity may be derived as follows based on the relationship between the individual flow velocity uniformities of the respective channels for each case. Accordingly, the design value where the whole flow velocity uniformity approaches 0 if possible is derived and thus the flow guide may be disposed.

$$\text{Flow velocity uniformity} = -0.36 + 3.21a - 0.48b + 0.024c - 0.098d$$

It may be confirmed that among the above cases, the design factor of case No. 3 in which the interval of the central passage Pc is 5 mm, the interval of the side passage Ps is 10 mm, the angle of the disposition line Lp is 0°, the distance between the exit of the inlet 5 and the flow guide 13 is 40 mm is an optimum design value where the flow velocity uniformity approaches 0 if possible.

Based on the above relationship formula, according to the embodiment of the present invention, it can be appreciated that reducing the interval of the central passage Pc derives the flow velocity uniformity approaching 0 relatively more easily than increasing the interval of the side passage Ps. As a result, it is possible to derive the case in which the flow velocity uniformity approaches 0 by changing the design value.

As described above, according to the embodiment of the present invention, the cooling water introduced into the cooling channel 3 through the inlet 5 is guided by the flow guides 13 and flows, and as a result the cooling water is not concentrated on the central passage Pc but flows while being diffused to the side passages Ps at both sides of the central passage Pc.

Therefore, the cooling water flowing in the cooling channel 3 uniformly flows in the respective branch channels 11 by the flow guides 13 to increase heat exchange efficiency between the battery module 1 and the cooling water to thereby improve the cooling efficiency as well as to reduce a pressure loss for the flow of cooling water in the cooling channel 3 to thereby reduce a pumping loss, thereby improving fuel efficiency.

In embodiments, referring to FIGS. 1-5, a battery cooling apparatus includes a surface contacting and/or attached to a battery 1 for cooling the battery 1. The cooling apparatus a housing which defines an inner space 3. The cooling apparatus further includes an inlet 5 and an outlet 7. Thus, cooling water supplied by a pump is received through the inlet, flows through the inner space and is discharged through the outlet.

In embodiments, the cooling apparatus further includes a plurality of parallel partition walls 9 which extend along a length direction of the cooling apparatus and form plurality of parallel channels 11 in the inner space 3. The channels 11 extend along the length direction. The inner space 3 includes an upstream portion located between the inlet 5 and the channels 11 and a downstream portion located between the outlet 7 and the channels 11.

In embodiments, a plurality of guide walls 13 are formed in the upstream portion. In an embodiment, the guide walls 13 are aligned along a direction generally perpendicular to the length direction. In another embodiment, some of the guide walls 13 are aligned along a first inclined direction with respect to the length direction, and the other guide walls are aligned along a second inclined direction with respect to the length direction. In embodiments, each guide wall 13 is spaced from the corresponding one of the partition walls and is disposed on an imaginary line extending from the corresponding partition wall 9. In embodiments, the upstream portion includes a first portion located between the inlet 5 and the guide walls 13 and a second portion located between the guide walls 13 and the channels 11. In one embodiment, no additional partition or guide wall is provided in the second portion. The cooling water that passes through openings formed between the guide walls passes the second portion before the cooling water enters into the channels 11.

According to the embodiments of the present invention, the flow guide may make the cooling water flowing in the cooling channel uniformly flow in the respective branch channels to increase the heat exchange efficiency between the battery module and the cooling water to thereby improve the cooling efficiency of the battery as well as to reduce the pressure loss for the flow of cooling water in the cooling channel to thereby reduce the pumping loss, thereby improving the fuel efficiency.

Meanwhile, although specific examples of the present invention have been described above in detail, it is obvious to those skilled in the art that various modifications and alterations may be made without departing from the spirit and scope of the present invention. In addition, it is obvious that these modifications and alterations are within the following claims.

What is claimed is:

1. An apparatus for cooling a battery, comprising:
    a cooling channel disposed to exchange heat with a battery module by cooling water and provided with an inlet into which the cooling water is introduced and an outlet through which the cooling water is discharged;
    branch channels formed in the cooling channel and extending in parallel with a longitudinal direction of the cooling channel to make the cooling water introduced through the inlet flow toward the outlet while the cooling water passes through the branch channels; and
    a plurality of flow guides disposed between the inlet and the branch channels at a predetermined interval and configured to guide the flow of the cooling water introduced through the inlet to allow the cooling water to be uniformly introduced into the respective branch channels;
    passages formed between the flow guides, wherein each passage and a corresponding one of the branch channels are aligned such that a straight imaginary line extends in the longitudinal direction and passes a pair of the corresponding passage and branch channel; and
    partition walls defining the branch channels and extending the longitudinal direction of the cooling channel, and each flow guide is disposed on an imaginary extension line continued in the longitudinal direction from one of the partition walls,
    wherein the passages include a central passage formed between two flow guides and disposed on a straight line extending in the longitudinal direction from an exit of the inlet to the inside of the cooling channel, and side passages formed between the remaining flow guides,
    wherein a width direction length of the central passage is formed to be shorter than that of the side passages,
    wherein the flow guides disposed at one side with respect to the central passage are disposed on a virtual disposition line formed in a straight shape,
    wherein the width direction length of the central passage, the width direction length of each side passage, an angle formed by the virtual disposition line and the width direction of the cooling channel, and a shortest distance between the flow guide forming the central passage and the exit of the inlet are used to make a flow velocity distribution of cooling water uniform in the cooling channel.

2. The apparatus of claim 1, wherein the flow guide is disposed between the inlet and an entrance of the branch channel.

3. The apparatus of claim 1, wherein two neighboring side passages respectively corresponding two neighboring branch channels have the same width direction length.

4. The apparatus of claim 1, wherein the flow guides disposed at the other side with respect to the central passage are disposed on another virtual disposition line formed in a straight shape.

5. The apparatus of claim 4, wherein the flow guide is formed in a board shape formed long in a longitudinal direction, and
    the flow guide is disposed so that the longitudinal direction of the flow guide coincides with a longitudinal direction of the disposition line.

6. The apparatus of claim 4, wherein the disposition line is formed in a width direction orthogonal to the longitudinal direction of the cooling channel and thus the flow guide is provided along the width direction orthogonal to the longitudinal direction of the cooling channel.

7. The apparatus of claim 1, wherein the flow guides are disposed to be spaced apart from each other by a predetermined distance and spaced from the exit of the inlet toward the inside of the cooling channel.

8. The apparatus of claim 4, wherein the width direction length of the central passage is 3 to 7 mm,
    the width direction length of the side passage is 8 to 12 mm,
    the disposition line is formed in the width direction orthogonal to the longitudinal direction of the cooling channel, and
    a shortest distance between the flow guide forming the central passage and the exit of the inlet is 38 to 42 mm.

* * * * *